May 5, 1959 R. B. LANGE 2,884,741
FLOWER POT COVER
Filed Aug. 13, 1956
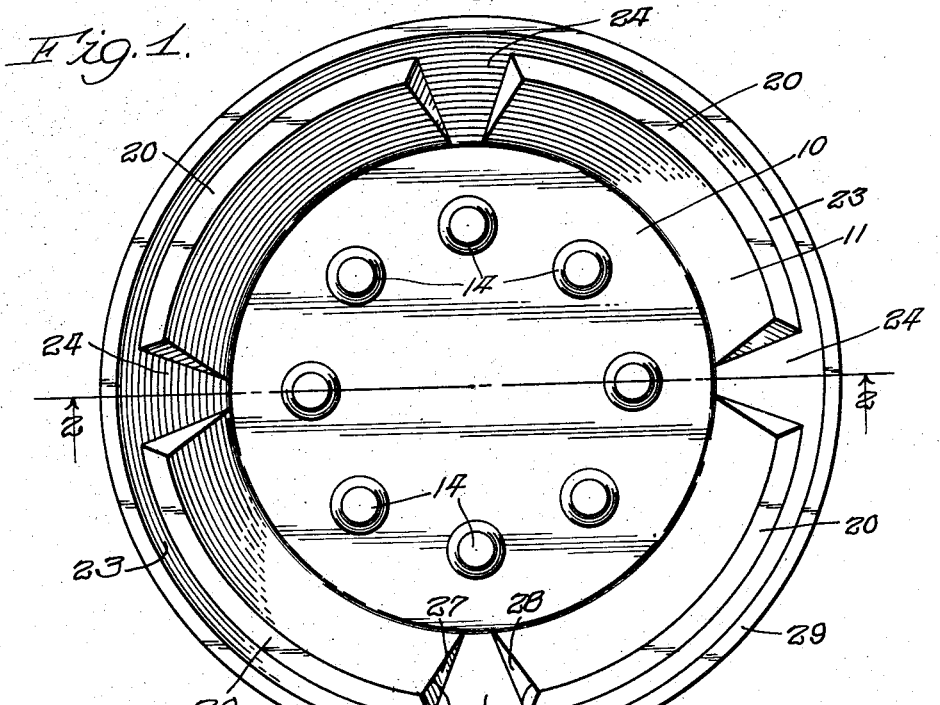
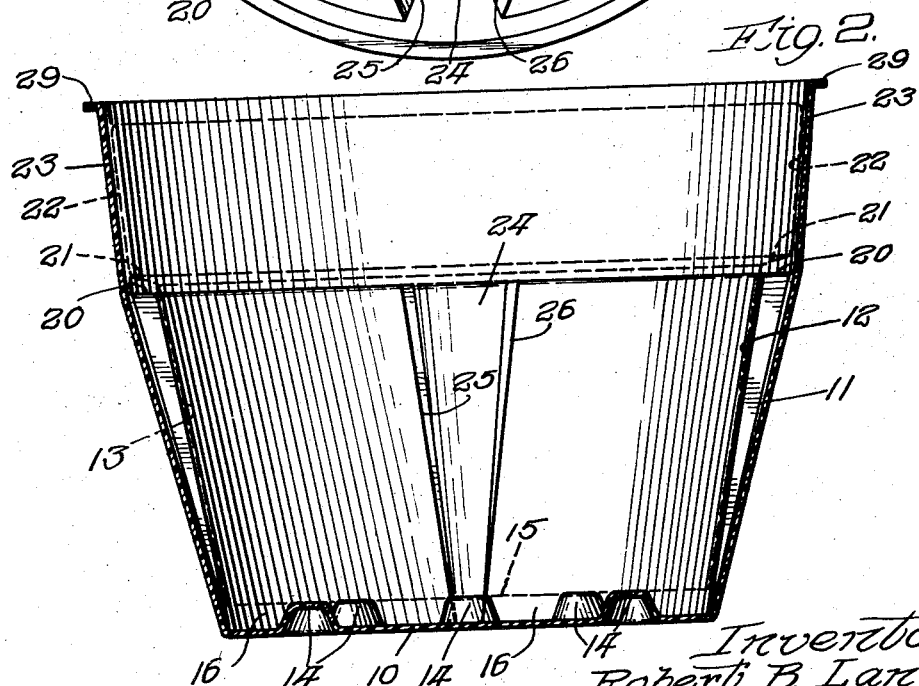
Inventor:
Robert B. Lange,
By Merriam, Lorch,
Attys.

2,884,741
FLOWER POT COVER

Robert B. Lange, Dubuque, Iowa, assignor to Lange Plastics Co., Dubuque, Iowa, a corporation of Iowa Application August 13, 1956, Serial No. 603,541

2 Claims. (Cl. 47—34)

This invention relates to potted flowers and plants. More particularly, this invention is concerned with means of covering the exterior of the usual nursery pots used to hold flowers and plants.

It has become the practice of most florists marketing potted flowers and plants in the usual red clay pots to wrap the pot in a metal foil, particularly aluminum, colored paper, or the like. This is done to cover the drab pot and make a more attractive package. This practice, however, is not entirely satisfactory to either the florist, the buyer, or the person who will receive the flower or plant as a gift. The florist finds it time consuming to effect the wrapping. If he uses paper it becomes unsightly if the plant or pot is wet; if metal foil is employed, handling compresses it into numerous folds and a crushed wrinkled appearance results. The buyer and gift receiver each desire something more elegant and serviceable than paper and foil around the pot. In addition, the person who ultimately receives the plant or flower wishes to be able to water it without further effort on his part such as transplanting it to a container which will not let water through onto furniture and the like.

According to the present invention there is provided a novel flower and plant pot cover and holder into which a conventional clay pot containing a plant or flower may be readily inserted. The pot cover, by surrounding the dull clay pot, beautifies the potted plant and makes it more acceptable. With this cover the florist need only take a second to slip the cover on the clay pot and he has a beautiful container which promotes the life of the potted plant.

The pot cover comprises essentially a circular bottom or base, a conical section lower shell portion communicating with the circular bottom, the conical section being of greater diameter at the top than at the bottom, a lateral flange at the top of the conical section, and a circular upwardly projecting shell portion communicating with the outer edge of the flange. The cover is also generally provided with means projecting upwardly from the bottom of the cover upon which a clay pot can rest to provide a collecting space for excess water. At least one vertical channel is also generally provided in the conical section to facilitate evaporation of water from inside the pot cover as well as the walls of the clay pot.

The invention will now be described in conjunction with the attached drawings in which:

Figure 1 is a plan view of a pot cover; and

Figure 2 is a sectional elevation taken at the line 2—2 of Figure 1.

The pot cover will be seen in the drawings to have a generally circular base or bottom 10 from which conical shell section 11 projects upwardly. The conical section has a greater diameter at the top than at the bottom. However, the taper and size of the conical section is predetermined to essentially coincide with that of a standard size clay flower pot to be inserted therein, with sufficient clearance therebetween to facilitate insertion and removal of the pot. The clearance 12 is shown in Fig. 2 wherein the dotted lines 13 represent the profile of a pot; this clearance is preferably made about 1/16 of an inch so that the cover will not hinder evaporation of water.

An essentially circular flange 20 extends laterally from the top of the conical section and is so positioned that it will be below the lower edge 21 of the flower pot rim 22; in this way clearance is provided which lets the bottom of the pot 15 be supported by the cover bottom rather than the cover shell.

Extending upwardly from the flange 20 is circular upper rim shell portion 23. It preferably extends above the top edge 24 of the pot placed in the cover. The shell portion 23 may be tapered outwardly as it projects upwardly or it may be cylindrical in shape; the shape however is predetermined to provide for receipt in the cover of a standard size clay pot. A clearance of about 1/16 inch is preferably provided between the upper shell portion and the pot.

Projecting means are provided in the base 10 of the pot cover and support the bottom of the pot, shown by dotted line 15, above the bottom 10 of the pot cover. The projecting means, such as nipples 14, may be any size or shape but preferably are maintained small in area so that a maximum space 16 will be available between the bottom of the pot cover 10 and the bottom of the flower pot 15 as a reservoir. In the drawing a plurality of nipples are shown circularly arranged in the cover bottom. Other patterns such as a square or diamond shape may be used if desired. Excess water which drains through the hole in the bottom, and which seeps through the porous sides of the pot will collect in the reservoir. Accumulation of excess water in the reservoir, rather than in the pot, prevents rotting of the roots of the potted plant which otherwise would occur. It is, of course, well known that when excess water causes the roots to rot, the life of the plant is shortened. The size of the reservoir will, of course, vary in size according to the size pot to be placed in the holder. With the more popular sized pots, however, a reservoir of from about 1/4 inch to about 1/2 inch in depth is preferred.

At least one, and preferably a plurality of vertical channels 24 are positioned in the conical shell section 11. The channels may be of uniform depth but usually are formed with variable depth, being most shallow at the lower end and of greatest depth at the top. Channels of variable tapered depth are preferred which have essentially no depth at the bottom and a depth at the top corresponding to the width of the flange 20 so that the channels terminate at the flange and the bottoms of the channels merge smoothly with the upper shell rim portion 23.

The channels 24 may have parallel sides 25 and 26. Nesting of the covers for storage and shipment however is more readily effected if these sides taper outwardly or are wider at the top than the bottom. The sides 27 and 28 of the channels, in addition, are preferably slanted inwardly from the sides 25 and 26 resulting in a channel bed narrower than the channel at its banks; this also favors nesting of similar covers.

The outside top edges of the flower pot cover are preferably beaded or flanged 29 outwardly from the upper shell rim portion 23. This adds rigidity to the top edge and prevents a rough or ragged surface from being exposed as a result of molding.

The channels 24 vent the cover, let air around the pot, and facilitate evaporation of the water in the reservoir. The clay pot, by being positioned with minimum clearances between the inside walls of the cover, acts as a wick and draws moisture out of the reservoir 16.

The flower and plant cover may be made of any suitable durable materials, either rigid or semi flexible, such as metals or plastics. Plastics are preferably employed because they are inexpensive, easily molded, light weight, durable and readily colored. Polystyrene, such as in .045 inch sheets, is a highly suitable plastic material to use for the cover.

What is claimed is:

1. A flower and plant pot cover comprising a circular essentially horizontal bottom, a conical section lower shell portion communicating with the circular bottom, the conical section being of greater diameter at the top than at the bottom, a lateral flange at the top of the conical section projecting outwardly therefrom, a circular upwardly projecting shell portion communicating at the lower edge thereof with the outer edge of the flange, and at least one vertical channel in the conical section with the channel bed open to the inside of the pot cover, said channel extending into the lateral flange and having a depth at the upper end essentially the width of the lateral flange, and said channel merging with the conical section at the lower edge of said section.

2. A flower and plant pot cover according to claim 1 in which the vertical channel has sides slanted inwardly and the bed of the channel is narrower than the channel width across the top of the channel, and the vertical channel tapers smoothly and has a width greater at the upper end than at the lower end.

References Cited in the file of this patent

UNITED STATES PATENTS

| 2,253,817 | Simmons | Aug. 26, 1941 |

FOREIGN PATENTS

| 197,328 | Germany | Apr. 13, 1908 |
| 517,062 | Great Britain | Jan. 18, 1940 |